US012192727B2

(12) United States Patent
Jin et al.

(10) Patent No.: US 12,192,727 B2
(45) Date of Patent: *Jan. 7, 2025

(54) MULTIFUNCTIONAL ACOUSTIC DEVICE

(71) Applicants: AAC Microtech (Changzhou) Co., Ltd., Changzhou (CN); AAC ACOUSTIC TECHNOLOGIES (SHENZHEN) CO., LTD., Shenzhen (CN)

(72) Inventors: Xin Jin, Shenzhen (CN); Fan Zhang, Shenzhen (CN); Ronglin Linghu, Shenzhen (CN); Bo Xiao, Shenzhen (CN); Wei Song, Shenzhen (CN)

(73) Assignees: AAC Microtech (Changzhou) Co., Ltd., Changzhou (CN); AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 158 days.

This patent is subject to a terminal disclaimer.

(21) Appl. No.: 17/949,233

(22) Filed: Sep. 21, 2022

(65) Prior Publication Data

US 2023/0328441 A1 Oct. 12, 2023

(30) Foreign Application Priority Data

Apr. 7, 2022 (CN) ........................ 202220795446.8

(51) Int. Cl.
*H04R 9/02* (2006.01)
*H04R 1/02* (2006.01)

(52) U.S. Cl.
CPC ............... *H04R 9/025* (2013.01); *H04R 1/02* (2013.01)

(58) Field of Classification Search
CPC .......... H04R 9/06; H04R 1/021; H04R 9/025; H04R 9/10; H04R 7/04; H04R 2499/11; H04R 1/288; H04R 1/02; H04R 9/02; H04R 1/24; H04R 9/063; H04R 7/16; H04R 2400/11
USPC ................................ 381/345, 409–413, 433
See application file for complete search history.

(56) References Cited

U.S. PATENT DOCUMENTS 10,524,032 B1 * 12/2019 Gu ......................... H04R 9/025
2012/0155696 A1 * 6/2012 Zhang ...................... H04R 9/06 381/412
2017/0026755 A1 * 1/2017 Mao ......................... H04R 9/06
2019/0141436 A1 * 5/2019 Chen ...................... H04R 1/288

(Continued)

*Primary Examiner* — Carolyn R Edwards
*Assistant Examiner* — Julie X Dang
(74) *Attorney, Agent, or Firm* — W&G Law Group

(57) ABSTRACT

The present invention provides a multifunctional acoustic device includes a cover enclosing an accommodating cavity and an acoustic member. The cover has a sound hole. The acoustic member includes a housing, a vibration system having a diaphragm, and a magnetic circuit system driving the diaphragm. The diaphragm divides a space of the housing into a front acoustic cavity and a rear acoustic cavity. The multifunctional acoustic device includes a sound channel communicating the sound hole with the front acoustic cavity and a sealing element located between the sound hole and the sound channel. The sealing element is arranged on a peripheral side of the sound channel so that the acoustic member communicates with an outside only through the sound channel.

7 Claims, 5 Drawing Sheets

(56) References Cited

U.S. PATENT DOCUMENTS

| | | | | |
|---|---|---|---|---|
| 2020/0053443 | A1* | 2/2020 | Wang | H04R 1/025 |
| 2023/0328442 | A1* | 10/2023 | Jin | H04R 1/2811<br>381/412 |

* cited by examiner

MULTIFUNCTIONAL ACOUSTIC DEVICE

FIELD OF THE PRESENT INVENTION

The present invention relates to the technical field of electronic device, and more particularly, to a multifunctional acoustic device.

DESCRIPTION OF RELATED ART

Whit the rapid development of electronic technology, portable consumer electronic products are becoming more and more popular, such as mobile phones, handheld game consoles, navigation devices or handheld multimedia entertainment devices, etc. These electronic devices generally provide system feedback through voice and/or vibration, such as phone call alerts, navigation alerts, and vibration feedback from game consoles.

In the electronic devices in related art, the waterproof structure design of the device is still lacking. Since the sound channel is directly fixed with the cover of the overall device, water vapor or dust often enters a rear cavity of a speaker, thereby affecting the performance of the speaker.

Therefore, it is desired to provide a new multifunctional acoustic device which can overcome the above problems.

SUMMARY

In view of the above, the embodiment of the present invention provides a new multifunctional acoustic device. By the present invention, the multifunctional acoustic device has a better performance and a simple structure.

The present invention provides a multifunctional acoustic device includes a cover enclosing an accommodating cavity and an acoustic member suspended in the accommodating cavity. The cover has a sound hole. The acoustic member includes a housing having a space, a vibration system having a diaphragm received in the housing, and a magnetic circuit system driving the diaphragm to vibrate and generate sounds along a first direction. The diaphragm divides the space of the housing into a front acoustic cavity and a rear acoustic cavity. The multifunctional acoustic device further includes a sound channel communicating the sound hole with the front acoustic cavity and a sealing element located between the sound hole and the sound channel. The sealing element is arranged on a peripheral side of the sound channel so that the acoustic member communicates with an outside only through the sound channel.

As an improvement, the sealing element comprises an outer fixing frame mounted with the cover, an inner fixing frame mounted with the sound channel, and a flexible connector connecting the outer fixing frame and the inner fixing frame.

As an improvement, the flexible connector comprises a first fitting portion fixed with the outer fixing frame, a second fitting portion fixed with the inner fixing frame, and a connecting portion connecting the first fitting portion and the second fitting portion.

As an improvement, at least part of the connecting portion is an arc structure.

As an improvement, the cover comprises a main body portion accommodating the acoustic member and an extension portion communicating with the main body portion and accommodating the sealing element, the sound hole arranged on the extension portion, and a size of the extension portion is smaller than a size of the main body portion.

As an improvement, the cover comprises a side wall enclosing the sound hole, and a projection of the side wall in a direction perpendicular to the first direction covers the outer fixing frame and at least part of the flexible connector.

As an improvement, the multifunctional acoustic device further comprises an elastic member for suspending the acoustic member in the accommodating cavity and a coil fixed on the cover, and the coil is energized by the magnetic circuit system to drive the acoustic member to vibrate along a second direction perpendicular to the first direction.

As an improvement, the cover, the housing of the acoustic member, a portion of an outer wall of the sound channel, and the sealing element cooperate to form a rear cavity, the housing comprising a through hole communicating the rear acoustic cavity and the rear cavity, a mesh member provided covering the through hole.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present invention more apparent, the present invention is described in further detail together with the figure and the embodiment. It should be understood the specific embodiment described hereby is only to explain the disclosure, not intended to limit the disclosure.

Figure 1:
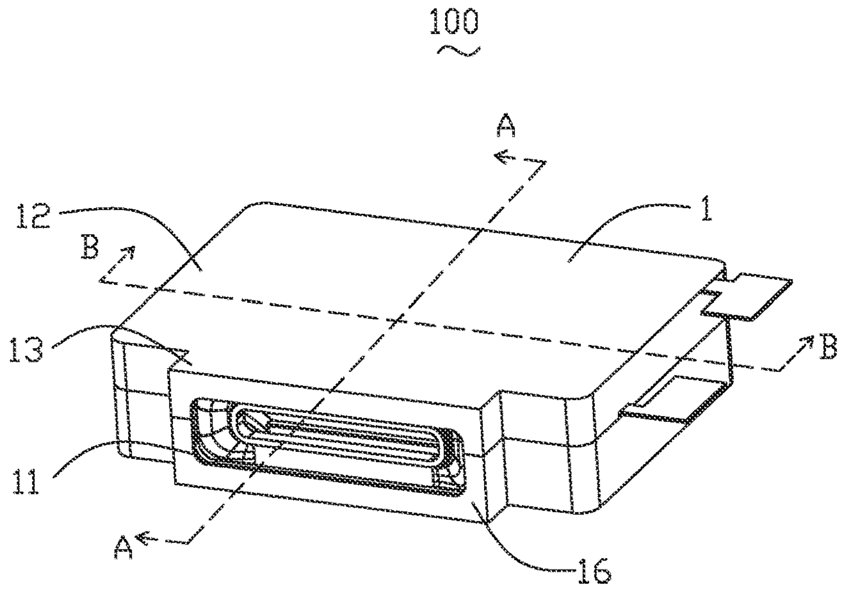
FIG. 1 is an illustrative isometric view of a multifunctional acoustic device in accordance with one embodiment of the present invention.
Figure 2:
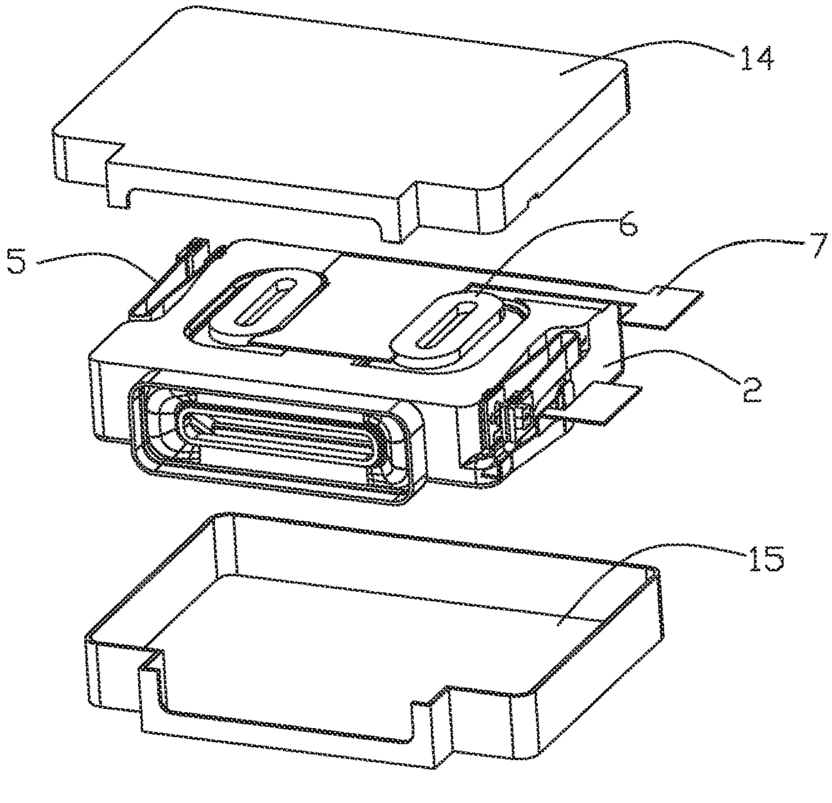
FIG. 2 is a partially exploded view of the multifunctional acoustic device of FIG. 1.
Figure 3:
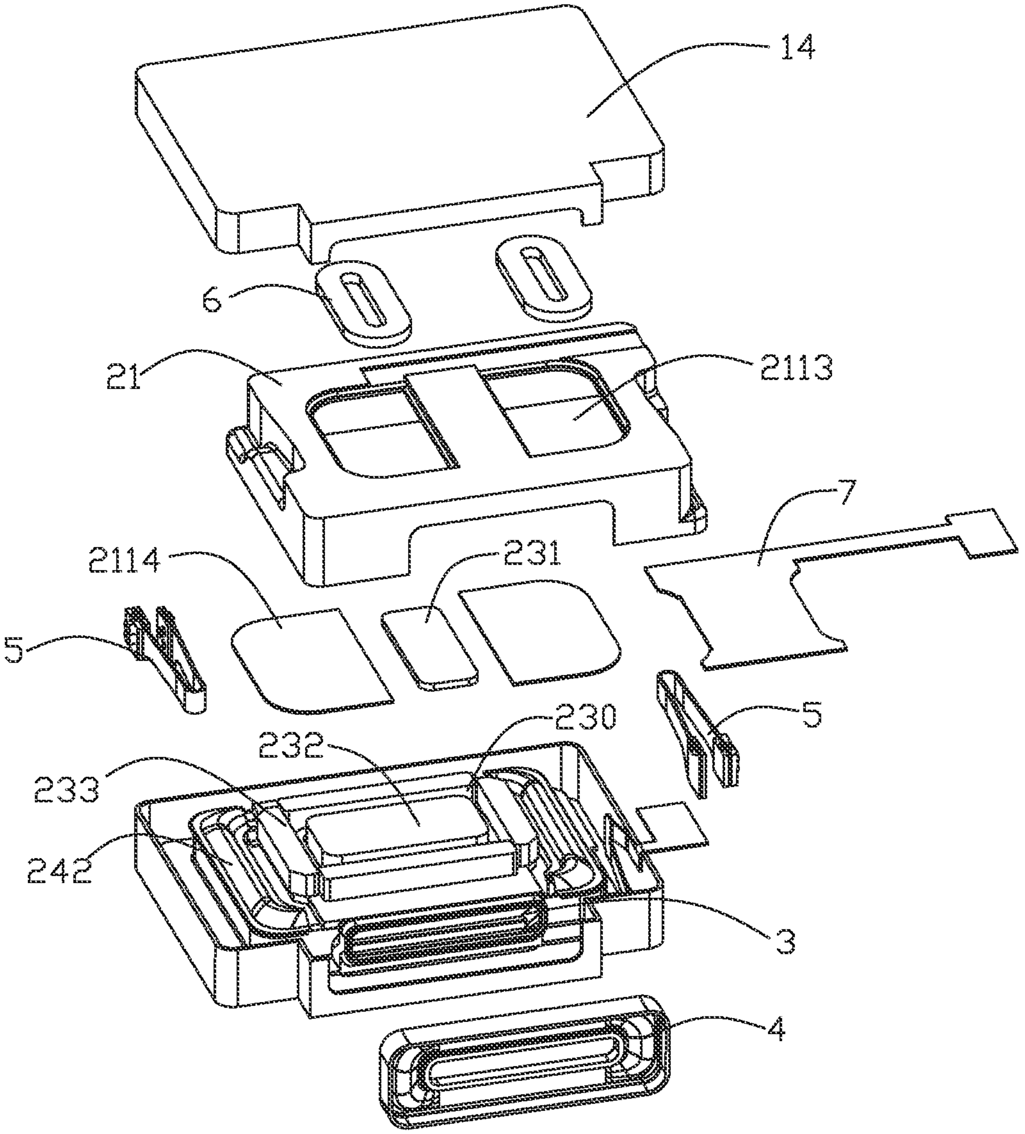
FIG. 3 is another partially exploded view of the multifunctional acoustic device of FIG. 1.
Figure 4:
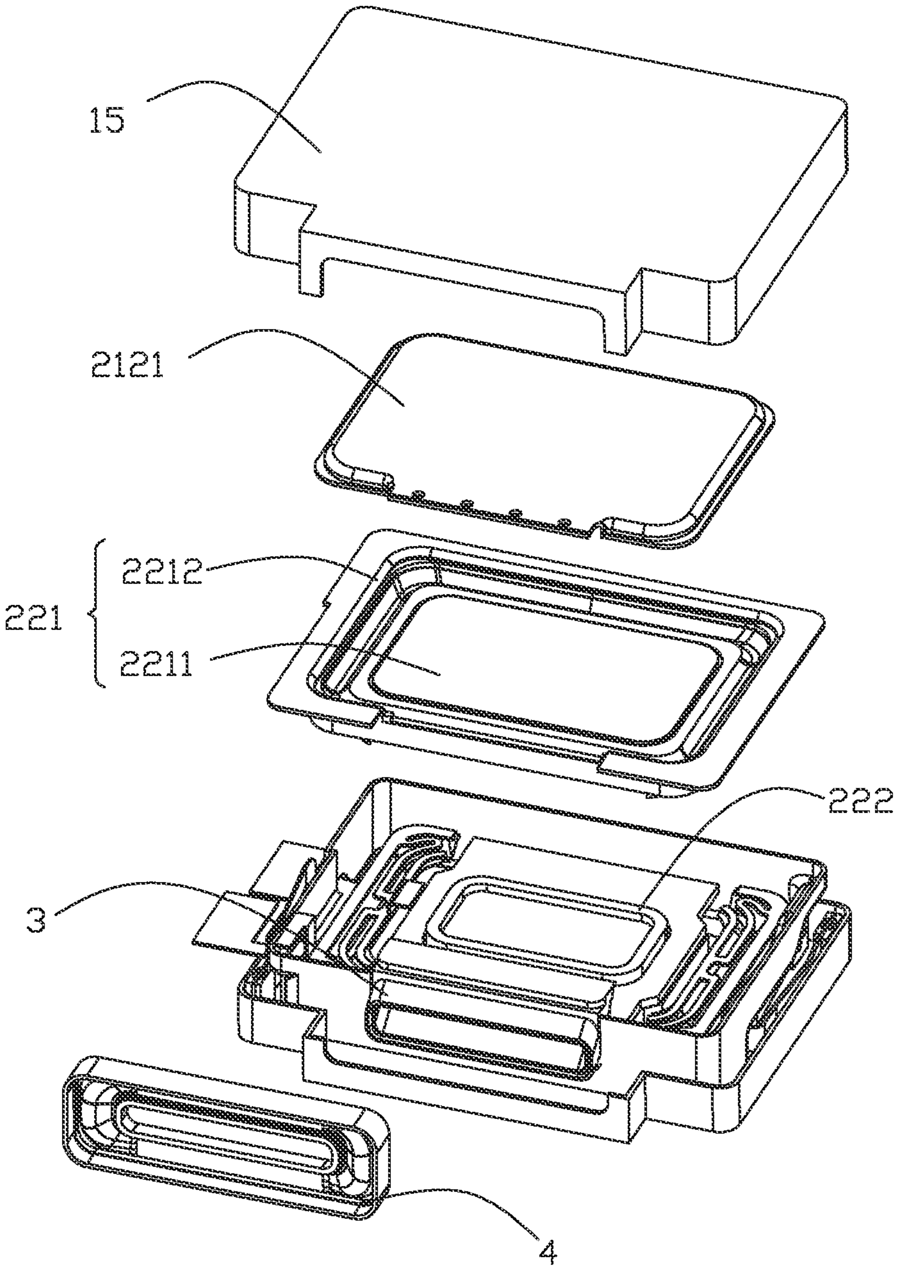
FIG. 4 is one more another partially exploded view of the multifunctional acoustic device of FIG. 1.
Figure 5:
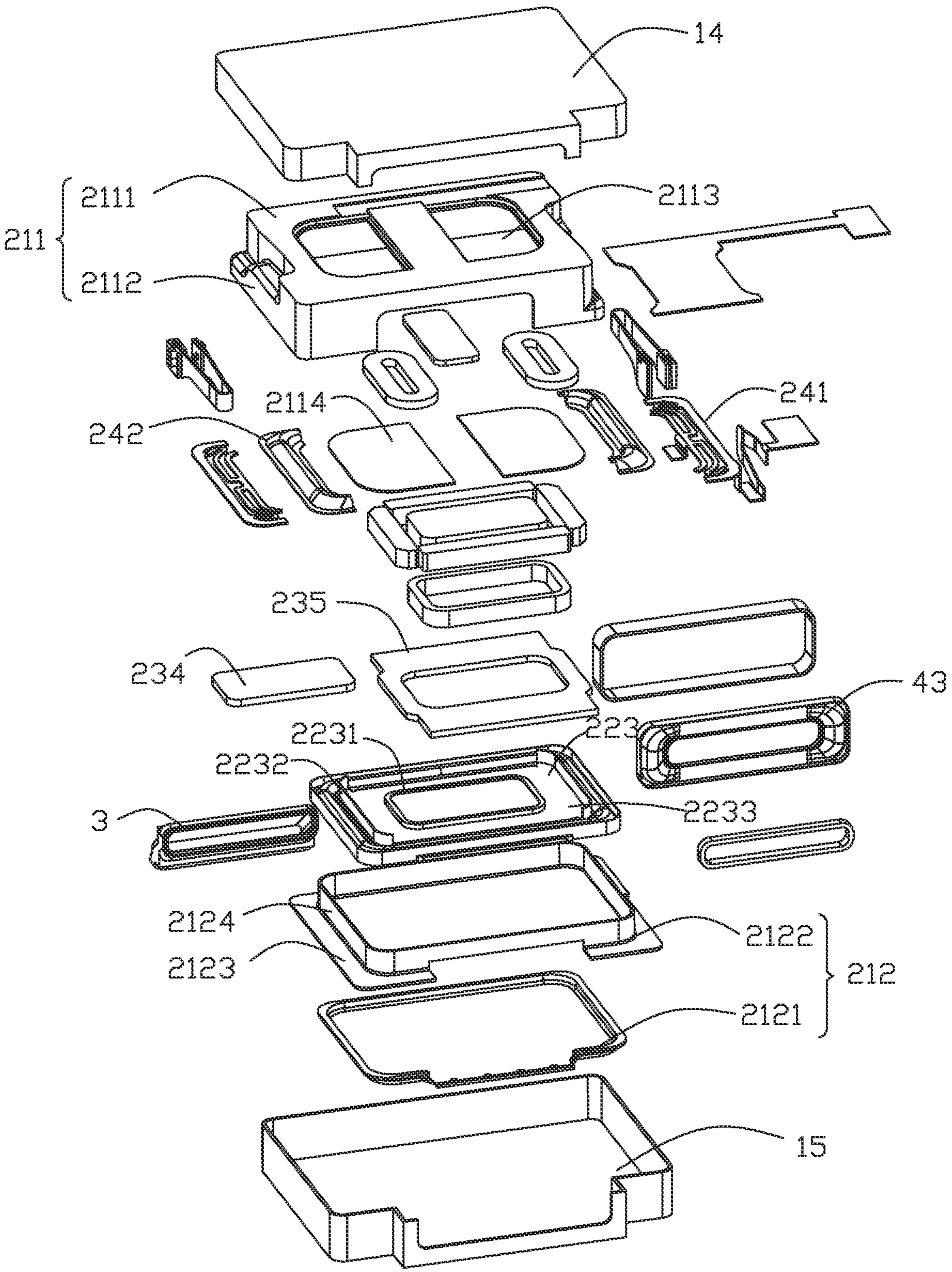
FIG. 5 is an exploded view of the multifunctional acoustic device of FIG. 1.
Figure 6:
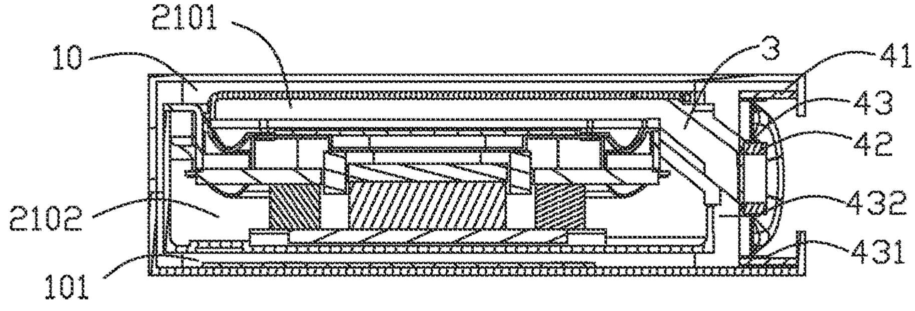
FIG. 6 is an illustrative cross-sectional view of the multifunctional acoustic device taken along line A-A of FIG. 1.
Figure 7:
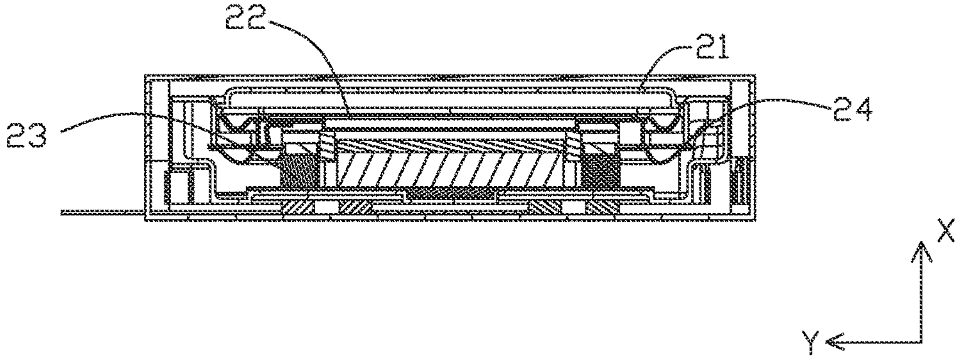
FIG. 7 is an illustrative cross-sectional view of the multifunctional acoustic device taken along line B-B of FIG. 1.
Figure 8:
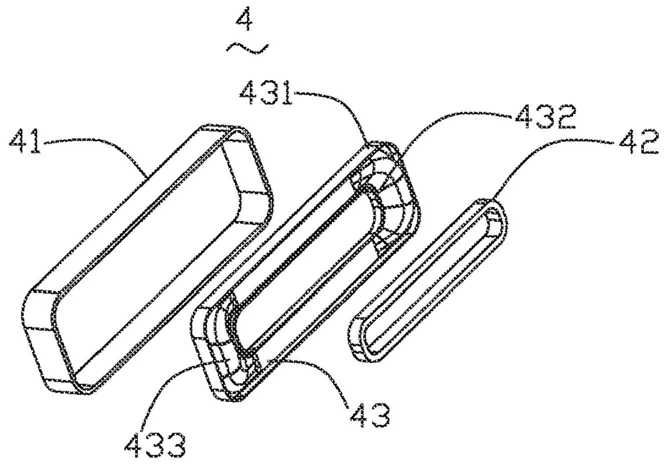
FIG. 8 is an illustrative isometric view of the sealing element of the multifunctional acoustic device of FIG. 1.

Referring to the FIGS. 1-8, the present invention provides one embodiment of a multifunctional acoustic device 100 which can be used in electronic devices. The multifunctional acoustic device 100 can not only generate sounds, but also function as a motor through vibration. The multifunctional acoustic device 100 includes cover 1 enclosing an accommodating cavity 10, an acoustic member 2 suspended in the accommodating cavity 10, a sound channel 3 guiding the sound generated by the acoustic member 2 out of the cover 1, a sealing element 4 disposed between the cover 1 and the sound channel 3, an elastic member 5 for suspending the acoustic member 2 in the accommodating cavity 10, a coil 6 fixed on the cover 1, and a first circuit board 7 electrically connected to the coil 6.

The cover 1 has a sound hole 11, and the sound channel 3 is communicated with the sound hole 11. The cover 1 includes a main body portion 12 accommodating the acoustic member 2 and an extension portion 13 communicating with the main body portion 12 and receiving the sealing element 4. The sound hole 11 is arranged on the extension portion 13, and a size of the extension portion 13 is smaller than a size of the main body portion 12. The cover 1 includes a first cover 14 and a second cover 15 cooperated forming the accommodating cavity 10 with first cover 14. The cover 1 further includes a side wall 16 enclosing the sound hole 11.

The acoustic member 2 includes a housing 21 with a space, a vibration system 22 received in the space, a magnetic circuit system 23 driving the vibration system 22 to vibrate and generate sounds along a first direction X, and an elastic support member 24 fixing the vibration system 22 to the housing 21. The magnetic circuit system 23 has a magnetic gap 230.

The housing 21 includes a lower housing 211 and an upper housing 212 assembled with the lower housing 211. The lower housing 211 includes a lower wall 2111 and a lower side wall 2112 bending and extending from the lower wall 2111. A through hole 2113 is provided on the lower wall 2111. A mesh member 2114 is provided covering the through hole 2113. The number of through holes and the mesh members is not limited. The upper housing 212 includes a cover plate 2121 and a support frame 2122 disposed between the cover plate 2121 and the lower side wall 2112. The support frame 2122 includes a first extending portion 2123 connected with the lower side wall 2112 and a second extending portion 2124 extending inwardly from the first extending portion 2123. The first extending portion 2123 is fixedly connected to the lower side wall 2112, and the cover plate 2121 is fixedly connected to the second extending portion 2124.

The vibration system 22 includes a diaphragm 221, a voice coil 222 at least partially inserted into the magnetic gap 230 and driving the diaphragm 221 to generate sounds, and a voice coil support 223 connecting with the diaphragm 221 and the voice coil 222. The elastic support member 24 connects with the housing 21 and the voice coil support 223. The diaphragm 221 divides the space of the housing 21 into a front acoustic cavity 2101 and a rear acoustic cavity 2102 opposite to the front acoustic cavity 2101. The cover plate 2121 and the diaphragm 221 cooperated enclose the front acoustic cavity 2101.

The diaphragm 221 includes an dome 2211 and an annular suspension 2212. The suspension 2212 surrounds the dome 2211. The voice coil support 223 comprises a first fixing portion 2231 fixedly connected with the voice coil 222, a second fixing portion 2232 fixedly connected with the elastic support member 24, and a junction portion 2233 connecting the first fixing portion 2231 and the second fixing portion 2232. The junction portion 2233 is a flat plate structure, and is connected to a side of the dome 2211 and the suspension 2212 proximal to the voice coil 222. The first fixing portion 2231 of the voice coil support 223 bends and extends from an inner end of the junction portion 2233 to a direction distal to the diaphragm 221. The second fixing portion 2232 bends and extends from an outer end of the junction portion 2233 to a direction distal to the diaphragm 221. The first fixing portion 2231 is arranged spaced apart form and opposite to the second fixing portion 2232. The first fixing portion 2231 extends toward the voice coil 222 and is fixedly connected to an end of the voice coil 222 closed to the diaphragm 221, and the second fixing portion 2232 extends toward the elastic support member 24 and is fixedly connected to the elastic support member 24.

The magnetic circuit system 23 comprises a yoke 231, a main magnet 232 mounted on the yoke 231, a plurality of auxiliary magnets 233 around and spaced apart from the main magnet 232 for forming the magnetic gap 230, a main pole plate 234 located on the main magnet 232, and an auxiliary pole plate 235 located on the auxiliary magnets 233. The number of the auxiliary magnets 233 is four, and the four auxiliary magnets 233 are arranged around the main magnet 232.

The elastic support member 24 includes a flexible circuit board 241 fixed on a side of the voice coil support 223 away from the diaphragm 221 and a support membrane 242 fixed on a side of the flexible circuit board 241 away from the diaphragm 221. The number of the support membranes 242 is two, and the number of the flexible circuit boards 241 is also two.

The sound channel 3 is disposed on a side of the acoustic member 2, and communicates with the front acoustic cavity 2101 of the acoustic member 2 and the sound hole 11 of the cover 1.

The sealing element 4 locates between the sound hole 11 and the sound channel 3, and is arranged on a peripheral side of the sound channel 3 so that the acoustic member 2 communicates with an outside only through the sound channel 3. The sealing element 4 comprises an outer fixing frame 41 mounted with the cover 1, an inner fixing frame 42 mounted with the sound channel 3, and a flexible connector 43 connecting the outer fixing frame 41 and the inner fixing frame 42. The flexible connector 43 comprises a first fitting portion 431 fixed with the outer fixing frame 41, a second fitting portion 432 fixed with the inner fixing frame 42, and a connecting portion 433 connecting the first fitting portion 431 and the second fitting portion 432. At least part of the connecting portion 433 is an arc structure.

A projection of the side wall 16 in a direction perpendicular to the first direction X covers the outer fixing frame 41 and at least part of the flexible connector 43, optionally, covers at least part of the connecting portion 433, so that not only a good waterproof sealing effect of the sealing member 4 is ensured, the side wall 16 further prevents the entry of water vapor and dust. In this embodiment, the projection direction is the direction of a short axis of the voice coil 222.

The cover 1, the housing 21 of the acoustic member 2, a portion of an outer wall of the sound channel 3, and the sealing element 4 cooperate to form a rear cavity 101, the rear acoustic cavity 2102 communicates to the rear cavity 101 though the through hole 2113 and the mesh member 2114. The present invention maximizes a volume of the rear cavity 101 through the design, and meanwhile, a space occupied by the sealing member 4 is also small, which enhances an acoustic performance of the multifunctional acoustic device 100 on the premise of a certain size.

The multifunctional acoustic device 100 also has the function of a motor, and the acoustic member 2 can be used as a vibrator of the motor. Specifically, the elastic member 5 suspends the acoustic member 2 in the accommodating cavity 10. The elastic member 5 is with a V-shape in this embodiment, one end of the elastic member 5 is fixedly connected to the cover 1, and the other end is fixedly connected to the housing 21.

The coil 6 used as a stator of the motor, which is fixed on an inner wall of the cover 1, and is arranged opposite to the magnetic circuit system 23 of the acoustic member 2.

Specifically, the through hole 2113 on the housing 21 of the acoustic member 2 is two, two through holes 2113 are covered with the mesh member 2114 respectively. The number of the coils is also two, and one coil 6 is provided on each side of the main magnet s 232, and the coil 6 is disposed opposite to the magnetic gap 230. The coil 6 is energized by the magnetic circuit system 23 to drive the acoustic member 2 to vibrate along a second direction Y perpendicular to the first direction X.

Comparing with the related art, in the multifunctional acoustic device of present invention, the multifunctional acoustic device includes a cover enclosing an accommodating cavity and an acoustic member received in the accommodating cavity. The cover has a sound hole. The acoustic member includes a housing having a space, a vibration system having a diaphragm received in the housing, and a magnetic circuit system driving the diaphragm to vibrate and generate sounds along a first direction. The diaphragm divides the space of the housing into a front acoustic cavity and a rear acoustic cavity. The multifunctional acoustic device further includes a sound channel communicating the sound hole with the front acoustic cavity and a sealing element located between the sound hole and the sound channel. The sealing element is arranged on a peripheral side of the sound channel so that the acoustic member communicates with an outside only through the sound channel. The multifunctional acoustic device of the present invention is easy to assemble, has good waterproof sealing effect, and minimizes the volume occupied by the sealing element, so that an internal space of the multifunctional acoustic device can be converted into the rear cavity to a greatest extent, which is beneficial to improve the performance of the multifunctional acoustic device.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A multifunctional acoustic device, comprising:

a cover enclosing an accommodating cavity, the cover having a sound hole; and an acoustic member suspended in the accommodating cavity, the acoustic member comprising:

a housing with a space;

a vibration system having a diaphragm received in the housing, the diaphragm dividing the space of the housing into a front acoustic cavity and a rear acoustic cavity;

a magnetic circuit system driving the diaphragm to vibrate and generate sounds along a first direction;

wherein the multifunctional acoustic device further comprises a sound channel communicating the sound hole with the front acoustic cavity and a sealing element located at the sound hole and the sound channel, the sealing element is arranged on a peripheral side of the sound channel so that the acoustic member communicates with an outside only through the sound channel; the sealing element comprises an outer fixing frame mounted with the cover, an inner fixing frame mounted with the sound channel, and a flexible connector connecting the outer fixing frame and the inner fixing frame.

2. The multifunctional acoustic device as described in claim 1, wherein the flexible connector comprises a first fitting portion fixed with the outer fixing frame, a second fitting portion fixed with the inner fixing frame, and a connecting portion connecting the first fitting portion and the second fitting portion.

3. The multifunctional acoustic device as described in claim 2, wherein at least part of the connecting portion is an arc structure.

4. The multifunctional acoustic device as described in claim 1, wherein the cover comprises a main body portion accommodating the acoustic member and an extension portion communicating with the main body portion and accommodating the sealing element, the sound hole arranged on the extension portion, and a size of the extension portion is smaller than a size of the main body portion.

5. The multifunctional acoustic device as described in claim 1, wherein the cover comprises a side wall enclosing the sound hole, and a projection of the side wall in a direction perpendicular to the first direction covers the outer fixing frame and at least part of the flexible connector.

6. The multifunctional acoustic device as described in claim 1, wherein the multifunctional acoustic device further comprises an elastic member for suspending the acoustic member in the accommodating cavity and a coil fixed on the cover, and the coil is energized by the magnetic circuit system to drive the acoustic member to vibrate along a second direction perpendicular to the first direction.

7. The multifunctional acoustic device as described in claim 1, wherein the cover, the housing of the acoustic member, a portion of an outer wall of the sound channel, and the sealing element cooperate to form a rear cavity, the housing comprising a through hole communicating the rear acoustic cavity and the rear cavity, a mesh member provided covering the through hole.

* * * * *